(12) United States Patent
Usoskin et al.

(10) Patent No.: US 8,411,401 B2
(45) Date of Patent: Apr. 2, 2013

(54) METHOD FOR CURRENT CONDITIONING, IN PARTICULAR ON A FAULT CURRENT LIMITER

(75) Inventors: Alexander Usoskin, Hanau (DE); Hans-Udo Klein, Sankt-Augustin (DE)

(73) Assignee: Bruker HTS GmbH, Hanau (DE)

( * ) Notice: Subject to any disclaimer, the term of this patent is extended or adjusted under 35 U.S.C. 154(b) by 402 days.

(21) Appl. No.: 12/923,322

(22) Filed: Sep. 15, 2010

(65) Prior Publication Data
US 2012/0002336 A1    Jan. 5, 2012

(30) Foreign Application Priority Data
Jul. 2, 2010 (EP) .................................... 10168256

(51) Int. Cl.
*H02H 9/00* (2006.01)
*H01F 6/02* (2006.01)
(52) U.S. Cl. ........................ 361/93.9; 335/216; 361/19
(58) Field of Classification Search .................. None
See application file for complete search history.

(56) References Cited

U.S. PATENT DOCUMENTS
6,016,094 A    1/2000    Gerhold

2007/0173410 A1*    7/2007    Usoskin et al. ............... 505/211
2008/0303489 A1*    12/2008    Park et al. ...................... 322/20
2009/0190224 A1*    7/2009    Iwasa ............................. 359/576

FOREIGN PATENT DOCUMENTS
DE    195 24 579    1/1997
JP    04 112 620    4/1992

* cited by examiner

*Primary Examiner* — Stephen W Jackson
*Assistant Examiner* — Angela Brooks
(74) *Attorney, Agent, or Firm* — Paul Vincent (57) ABSTRACT

A method for current conditioning, comprising transporting a primary current (1) through a primary coil (2), coupling a secondary coil (3) to the primary coil (2) via a common magnetic flux, wherein the secondary coil (3) comprises a superconductor capable of quenching, with the quenching causing a transition of the superconductor from a low resistance superconducting state to a high resistance quenched state, and in the low resistance superconducting state of the secondary coil (3), guiding a major fraction (8) of the common magnetic flux of the primary coil (2) and the secondary coil (3) within a ferromagnetic medium (5a), is characterized by upon quenching, switching the common magnetic flux such that a major fraction (17) of the common magnetic flux is guided outside the ferromagnetic medium (5a) in the high resistance quenched state of the superconductor. An economic and efficient method for current conditioning is thereby provided which reduces harmonic distortions.

20 Claims, 5 Drawing Sheets

METHOD FOR CURRENT CONDITIONING, IN PARTICULAR ON A FAULT CURRENT LIMITER

This application claims Paris Convention priority of EP 10 168 256.5 filed Jul. 2, 2010 the entire disclosure of which is hereby incorporated by reference.

BACKGROUND OF THE INVENTION

The invention relates to a method for current conditioning, comprising
  transporting a primary current through a primary coil,
  coupling a secondary coil to the primary coil via a common magnetic flux, wherein the secondary coil comprises a superconductor capable of quenching, with the quenching causing a transition of the superconductor from a low resistance superconducting state to a high resistance quenched state,
  and in the low resistance superconducting state of the secondary coil, guiding a major fraction of the common magnetic flux of the primary coil and the secondary coil within a ferromagnetic medium.

Such a method is known from DE 195 24 579 A1.

The present invention relates to a method for current conditioning and may be employed, in particular, in the fields of energy generation, transmission and distribution for grid and equipment protection against fault current.

Current conditioning is necessary in generation, transmission and distribution of energy. Current conditioning considered as current limitation of fault currents (e.g. short circuited currents) allows not only to protect electrical equipment against over-currents, but also to exploit already available equipment at a higher level of transported power.

In general, current conditioning may be provided via numerous methods, for instance, using methods of magnetic saturation (saturation reactors), mechanical switching, electronic switching (based on solid state switches), etc. Recently developed methods of current conditioning are based on the transition of a superconductor from a low resistive (superconducting) state to a high resistive (quenched) state and allow a conditioning of high currents at medium and high voltages. The most economic current conditioning methods using the transition of a superconductor, in particular with respect to power losses and cryo-consumption, are based on an inductive coupling of a circuit current to be conditioned with a superconductor. Here, no current leads connecting ambient temperature areas with cryogenic temperature areas are necessary; the superconductor (typically a short-circuited superconducting coil) may be completely encapsulated, so thermal insulation is simple and efficient. Several current conditioning methods aimed for limitation of fault currents were developed in the later field.

JP 04 112 620 A discloses a method for current conditioning wherein a circuit current (primary current) to be conditioned is transported through a primary coil, and a secondary coil, arranged radially within the primary coil and made of a superconducting material, is coupled to the first coil through a common magnetic flux. Both in the low resistance (superconducting) state and the high resistance (quenched) state of the secondary coil, the common magnetic flux is guided in air. The method allows only a small current conditioning effect, and more specifically, only a minor effect of current limitation.

A better degree of current conditioning was achieved when the guiding of the magnetic flux was performed within a ferromagnetic medium, compare the method described in DE 19 524 579. Here the circuit current (primary current) is transported through a primary coil, and a secondary coil, arranged radially outside the primary coil and made of a superconducting material, is coupled to the first coil through a common magnetic flux. Both in the high resistance (quenched) state and the low resistance (superconducting) state of the secondary coil, the common magnetic flux is guided within a ferromagnetic transformer core. However, in the high resistance state of the secondary coil, this method of current conditioning introduces severe harmonic distortions in the primary current; the total harmonic distortions may easily exceed 20 to 30%. These harmonic distortions are a severe threat to the safety of electric grids and electric equipment supplied with the primary current.

It is the object of present invention to provide an economic and efficient method for current conditioning which reduces harmonic distortions.

SUMMARY OF THE INVENTION

This object is achieved, in accordance with the invention, by a method as introduced in the beginning, characterized by
  upon quenching, switching the common magnetic flux such that a major fraction of the common magnetic flux is guided outside the ferromagnetic medium in the high resistance quenched state of the superconductor.

The inventors found that increasing the fraction of the magnetic flux that is guided outside the ferromagnetic medium leads to a quick drop down of the total harmonic distortion (THD) when the quenchable superconductor of the secondary coil is in the high resistive (quenched) state. Independently from the ferromagnetic material employed, the drop of the THD occurs when a major fraction of the common magnetic flux is outside the ferromagnetic medium. Thus, a switching (redistribution) of some share (percentage) of the common magnetic flux from the inner to the outer space with respect to the ferromagnetic medium at quenching allows to suppress at least part of the harmonic distortions.

Note that according to the invention, in the low resistance (superconducting) state of the superconductor, a major fraction of the common magnetic flux is guided within a ferromagnetic medium, which guarantees a good coupling of the first and second coils during normal operation and mainly during the initial stage of transition from the normal operation modus (low resistance state) to the high resistive state. Thus, the equipment for performing the inventive method can be kept relatively small. Further, the ferromagnetic medium also improves a current liming effect in the high resistance (quenched) state of the superconductor, by increasing the inductance of the primary coil.

Common magnetic flux here means that closed magnetic flux lines go through both the primary coil and the secondary coil. A major fraction here means more than 50%, preferably at least 75% (applicable to both the flux fraction within the ferromagnetic medium before quenching, and the flux fraction outside the ferromagnetic medium after quenching; note that these two flux fractions may be independent from each other and typically have different values). The magnetic flux may be calculated by integrating the magnetic flux density B (which results from $\mu_0 * \mu * H$) over the area A. $\mu_0$ and $\mu$ denote here the absolute and relative permeability, respectively.

A medium is considered ferromagnetic here if the relative magnetic permeability $\mu$ (in the non-saturated case) is 1.1 or higher, preferably 100 or higher (typically the relative magnetic permeability is on the order of 1000 or higher, for common iron material). Outside the ferromagnetic medium, there is a non-magnetic medium such as vacuum, a gas (e.g.

air), a non-magnetic liquid (e.g. liquid nitrogen) or a non-magnetic solid (e.g. brass, non-magnetic stainless steel, etc.), typically with a relative magnetic permeability of between 0.99 and 1.01.

The switching upon quenching includes a lowering of the share (percentage) of the common magnetic flux which is guided through the ferromagnetic medium typically by at least 25%, preferably at least 50%, most preferably at least 75% (with respect to the total common flux). In other words, the share (percentage) of the common magnetic flux which is guided in a non-magnetic medium is increased (Note that the total common magnetic flux increases upon quenching). As a result, after quenching, a major fraction of the common magnetic flux of the primary coil and the secondary coil is guided outside the ferromagnetic medium.

An advantageous variant of the inventive method is characterized by
in the low resistance state of the secondary coil, not saturating the ferromagnetic medium,
and in the high resistance state of the secondary coil, saturating the ferromagnetic medium. By not saturating the ferromagnetic medium in the low resistance state, a good coupling of the primary coil and the secondary coil may be established. Not saturated here means that the ferromagnetic medium is non-saturated on average; possibly there are very small areas (for example <1 volume %) which may be saturated because of local magnetic effects (edge areas, corners, etc.). Saturating the ferromagnetic medium in the high resistance state facilitates the switching of a substantial fraction of the common flux to outside the ferromagnetic medium upon quenching.

In another preferred variant, the total common magnetic flux in the low resistance state of the secondary coil ("non-balanced flux") is smaller than the common magnetic flux guided outside the ferromagnetic medium in the high resistance state of the secondary coil. Thus a good current limiting effect with reduced harmonic distortions may be achieved.

Further preferred is a variant wherein the primary current is an alternating current
or an alternating current superimposed with a direct current. Typically, the alternating current is of sine type. Such primary currents (circuit currents) may easily be conditioned by means of the inventive method.

An advantageous variant is characterized by arranging a coolant within the primary coil and/or the secondary coil outside the ferromagnetic medium. This coolant is for cooling the superconductor (which may, in particular, comprise HTS material with a critical temperature of 40K or more, preferably 85 K or more). Typically, the space within the primary coil and/or the secondary coil is only partly filled with coolant. The coolant may be arranged in a vessel such as a cryostat or a toroidal dewar. It is possible to arrange the secondary coil within the vessel. Coolants may be $LN_2$ or $LHe_2$ or $LNe_2$, for example. The vessel may allow a more compact construction, and a longer operation time between re-fillings. It should be noted that other ways for cooling the secondary coil may be applied, such as using coolants outside the coils and applying a metallic thermal coupling to these coolants, or direct cooling (in particular when high temperature superconductors are used).

Preferred is another variant wherein in the high resistance state of the secondary coil, the secondary current induced in the secondary coil has a modulus which is equal to or larger than $1/100$, preferably equal to or larger than $1/50$, of the modulus of the primary current multiplied by the number of windings of the primary coil. In this case, the secondary coil may additionally contribute to the current limitation/conditioning effect due to resistive losses introduced by secondary coil. In spite of certain suppression of the common magnetic flux, the total effect remains considerably positive.

Also within the scope of the present invention is a fault current limiter, in particular suitable for performing an inventive method as described above, comprising
a primary coil,
a secondary coil comprising a superconductor capable of quenching, and
a core of a ferromagnetic medium, running through both the primary coil and the secondary coil, characterized in that the core, the primary coil and the secondary coil are capable of switching of a substantial fraction of a common magnetic flux of the primary coil and of the secondary coil from within the core to outside the core upon quenching. By means of the inventive fault current limiter, high currents at medium or high voltages may be controlled with little effort, and harmonic distortions are not introduced in the high resistance (quenched) state. The core, the primary coil (in particular its geometry) and the secondary coil (in particular its geometry) are designed such that the switching of the common magnetic flux is achieved when the secondary coil quenches. Switching a substantial fraction here means that the fraction (percentage) of the common magnetic flux guided within the ferromagnetic medium in the low resistance superconducting state of the superconductor is at least 25%, preferably at least 50%, most preferably at least 75% (with respect to the total common magnetic flux), higher than in the high resistance quenched state of the superconductor.

In a preferred embodiment of the inventive fault current limiter, a major part of the cross-section of the primary coil and a major part of the cross-section of the secondary coil are not filled with ferromagnetic medium. This facilitates switching of substantial fractions of the common magnetic flux to the outside of the core. Here, a major part of the cross-section is more than 50%, preferably 75% or more; even 90% or more are possible in accordance with the invention. The (ferro-)magnetic core typically takes between 2% and 40%, preferably between 3% and 30%, most preferably between 5% and 20% of the cross-section of the primary coil and the secondary coil. Note that the percentages referring to the cross-section typically also apply to the percentages of volumes of the coil interiors.

Further preferred is an embodiment wherein the core is of a closed shape. This reduces stray fields.

Alternatively, in an also preferred embodiment, the core is of an open shape, in particular wherein the primary coil and the secondary coil are arranged coaxially. The open shape requires less ferromagnetic material. "Coaxially" here means that the coils have a common axis of rotation symmetry (note that the coils may be, but need not be circular shaped in cross-section; the coils may be for example of a rectangular-quadratic shape with a four-fold axis); typically, they are placed one inside the other (typically with the secondary coil as the inner coil). Furthermore, the coils are preferably positioned without axial shift (i.e. not one above other).

In another advantageous embodiment, the secondary coil is a single turn, short-circuited coil. Such a secondary coil is particularly simple to manufacture.

In a preferred further development of this embodiment, the single turn short-circuited coil comprises a multitude of rings which are coupled to each other. By using a plurality of rings, the absolute critical current at the secondary coil can be adjusted to a rated value. The coupling is done via a common magnetic flux or/and galvanically (i.e. electrically).

Also preferred is an embodiment wherein the fault current limiter further comprises a third coil for maintaining a screening eddy current, in particular wherein the third coil is a normally conducting, single turn short-circuited coil. This coil allows to fit conditioned or limited current to a rated value and in this way to provide a required ratio of the nominal current to the conditioned current ("conditioning" or "limitation" factor). If the third coil is of single turn type, it is particularly simple to manufacture. Note that the single turn type third coil may comprise a multitude of rings with are coupled to each other, in particular coupled via a common magnetic flux or/and galvanically (i.e. electrically).

In another advantageous embodiment, the secondary coil comprises a high temperature superconductor (HTS), preferably of coated conductor type. Than the costs for cooling the superconductor of the second coil can be kept low. The critical temperature $T_c$ of the high temperature superconductor typically is above 40K, preferably above 85 K. As HTS material, YBCO material may be used.

Also within the scope of the present invention is the use of an inventive fault current limiter as described above in an inventive method as described above.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

The invention is shown in the drawing.

DESCRIPTION OF THE PREFERRED EMBODIMENT

Figure 1A:
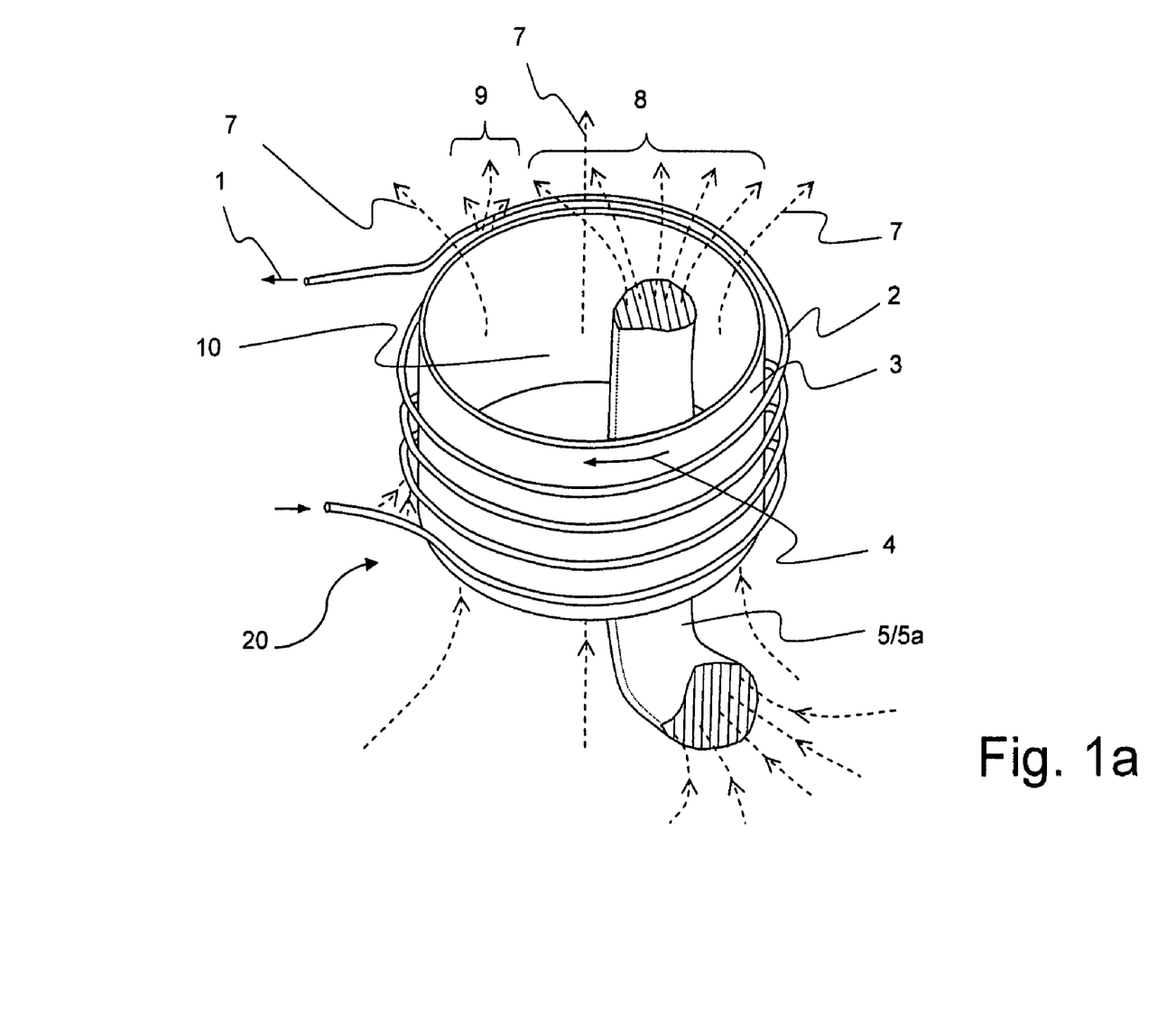
FIG. 1a shows schematically an embodiment of an inventive fault current limiter, for performing an inventive method, in a low resistance (superconducting) state of the secondary coil.

FIG. 1a illustrates an inventive fault current limiter 20, which may be used for carrying out the inventive method of current conditioning.

The fault current limiter 20 comprises a primary coil 2 which carries (transports) a primary current (or circuit current) 1, a secondary coil 3 which carries (i.e. transports) a secondary current 4, and a core 5 of a ferromagnetic medium 5a.

The primary coil 2 here comprises a plurality of windings (with five windings illustrated in FIG. 1a), whereas the secondary coil 3 is of single turn, short-circuited type. The secondary coil 3 comprises a quenchable superconductor such that the secondary current 4 in the secondary coil 3 can flow on a superconducting current path in a low resistance state (illustrated in FIG. 1a), or on a normally conducting current path in a high resistance (quenched) state. For cooling the secondary coil to (or below) a critical temperature $T_c$ of the superconductor, the secondary coil 3 is typically arranged in a vessel filled with a cryogenic fluid, for example liquid nitrogen (not shown here, for simplification).

The secondary coil 3 (or its secondary current 4, respectively) is inductively coupled to the primary coil 2 (or its primary current 1, respectively) via a common part of magnetic flux ("common magnetic flux"), compare the dashed flux lines. The primary current 1 causes magnetic flux density both within and outside the primary coil 2. The part of the magnetic flux which is both within the primary coil 2 and within the secondary coil 3 is considered the common part. The primary coil 2 and the secondary coil 3 are arranged coaxially, with the corresponding axis running vertically in FIG. 1a.

The core 5 is made of a ferromagnetic medium (material), typically iron, preferably soft iron, and may be either magnetically closed or open (in FIG. 1a, the core is shown truncated). The remaining space around the core 5 and within the secondary coil 3 is filled with a non-magnetic medium, here air. In the illustrated example, the core 5 takes about 5% of the cross-section (perpendicular to the vertical axis) of the secondary coil 3.

In normal operation (illustrated in FIG. 1a), when the primary current 1 (circuit current) is below a threshold which causes a quench in the superconductor of the secondary coil 3 (i.e. when the superconductor is in the low resistive, superconducting state), the superconductor screens (shields) the inner volume 10 of the secondary coil 3. Then only few magnetic flux penetrates in this inner volume 10 (see dashed flux lines). A major fraction 8 (here about 90%) of this penetrating magnetic flux (common magnetic flux) is guided inside the ferromagnetic medium 5a, i.e. via the ferromagnetic core 5, which is magnetically not saturated in this regime and therefore may exhibit a relatively high permeability (e.g. from 100 to 4000 or even more). A minor fraction 7 (here about 10%) of the common magnetic flux is guided outside the ferromagnetic medium 5a. The penetrating magnetic flux in this state, which causes "leakage" inductance, is rather small though (as compared to the penetrating magnetic flux in the non-shielded state, see below). Certain part of the leakage inductance originates from magnetic flux 9 occurring between the primary coil 2 and secondary coil 3. The sum of the fluxes 7, 8 is sometimes called "non-balanced flux".

At fault current operation (illustrated in FIG. 1b), the primary current (circuit current) 1 causes a secondary current 4 in the second coil 3 which exceeds the threshold of quench (i.e. the superconductor jumps into the high resistive state). As a result, the quenched superconductor does not screen (shield) the inner volume 10 the secondary coil 3 against magnetic flux any more (or at least not completely). The magnetic flux starts to penetrate significantly into this inner volume 10 (see dashed flux lines) and causes a re-distribution (or, in other words, re-switching) of flux fractions: A major fraction 17 (here about 70%) of the penetrating magnetic flux is guided now outside the ferromagnetic medium 5a, while a minor fraction 18 of the flux (here about 30%) is still guided within the ferromagnetic medium 5a. The ferromagnetic medium 5a becomes saturated under these conditions.

Figure 1B:
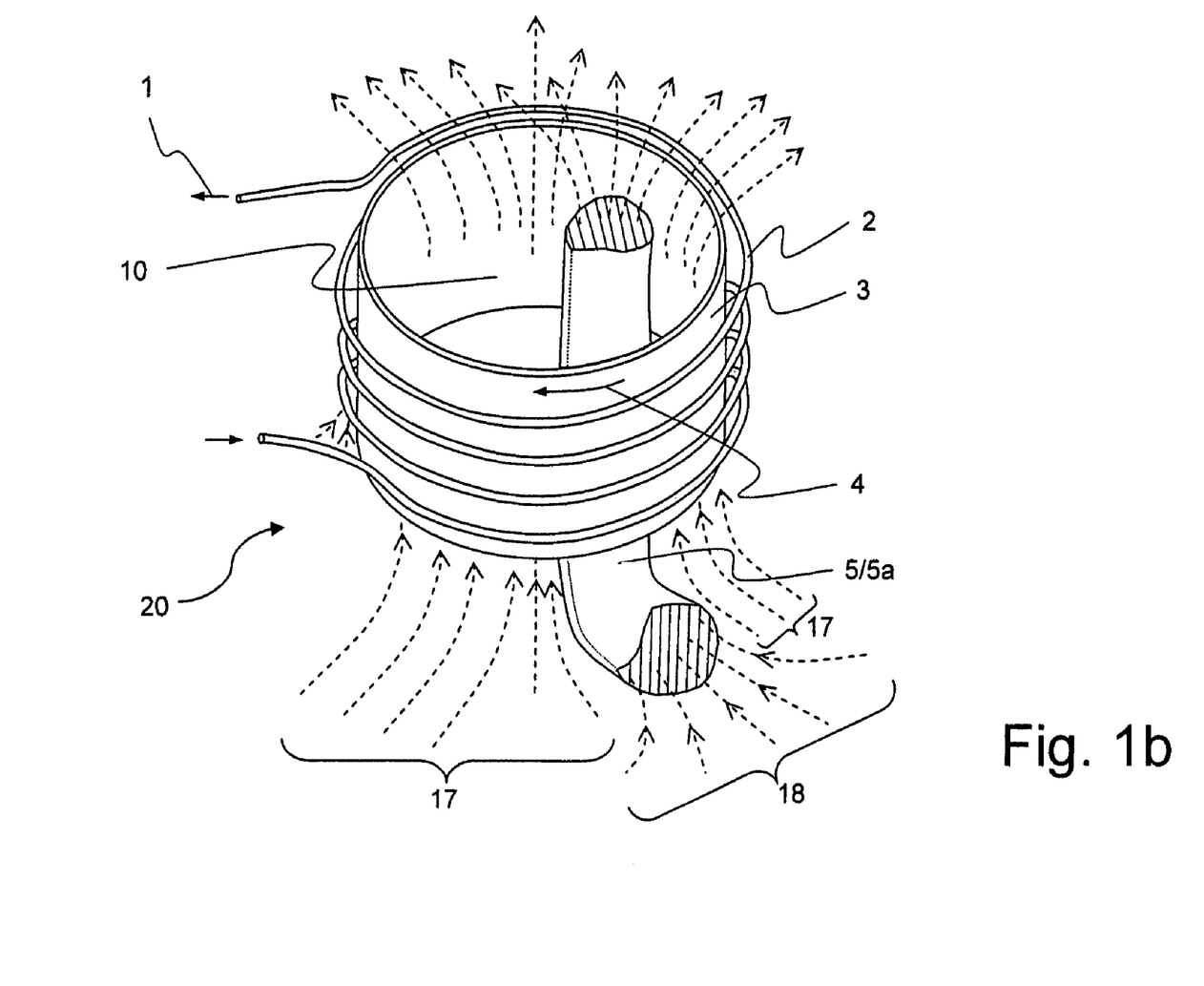
FIG. 1b shows the fault current limiter of FIG. 1a, in a high resistance (quenched) state of the secondary coil.

In the illustrated example, the fraction of the common magnetic flux guided within the ferromagnetic medium 5a has dropped from about 90% to about 30% (with respect to the respective total common flux) upon quenching, meaning that a fraction of about (90–30) %=60% of the common magnetic flux has been switched from inside the ferromagnetic medium 5a to outside of the ferromagnetic medium 5a.

Typically, the major fraction 17 of the magnetic flux appearing when the quenchable superconductor is in the high resistive state exceeds in absolute terms the non-balanced flux (sum of flux fractions 7 and 8) appearing when the quenchable superconductor is in the low resistive state.

Due to the significant increase of the entire absolute magnetic flux (sum of fluxes 17 and 18, as compared to the sum of fluxes 7 and 8), the inductance of the primary coil 2 increases, which results in an increase of impedance to which the primary current 1 is subject to. Thus the primary current (circuit current) 1 starts to be conditioned. Further, a substantial secondary current 4 is induced in the second coil 3 when the quenchable superconductor is in the high resistive state, what additionally contributes to the impedance of the primary coil 2; this current 4 is mainly based on the conductivity of the shunt attached to the quenchable superconductor.

When the ferromagnetic medium 5a becomes magnetically saturated, permeability becomes substantially time/field dependent. This may cause nonlinearities during a sine cycle of the voltage fed at the primary coil 2, which may potentially result in the generation of harmonics and, finally, in significant total harmonic distortion of the sine wave of the primary current 1.

The THD is most commonly defined as a ratio of the sum of the powers of all harmonic frequencies above the fundamental frequency to the power of the fundamental frequency:

$$THD = \frac{\sum \text{harmonic powers}}{\text{fundamental frequency power}} = \frac{P_2 + P_3 + P_4 + \ldots + P_n}{P_1}$$

By means the invention, the THD may be kept at a sufficiently low level when the re-switching of flux fractions is performed in a proper way. With the inventive switching of the flux fractions, the contribution of the common magnetic flux guided within a ferromagnetic medium in the high resistive state of the superconductor, when the ferromagnetic medium is typically saturated, is limited. Thus, non-linearities introduced by the saturated ferromagnetic medium are limited too. Instead, the common magnetic flux originates to a major degree from outside the ferromagnetic medium, i.e. from a non-magnetic medium, where it is not deteriorated by non-linearity effects. Thus, less harmonic distortions occur in the primary current in the fault current operation. Thus, electric grids and equipment attached to the primary coil face less high frequency peaks, which are particularly dangerous even at relatively low current strengths.

Figure 2:
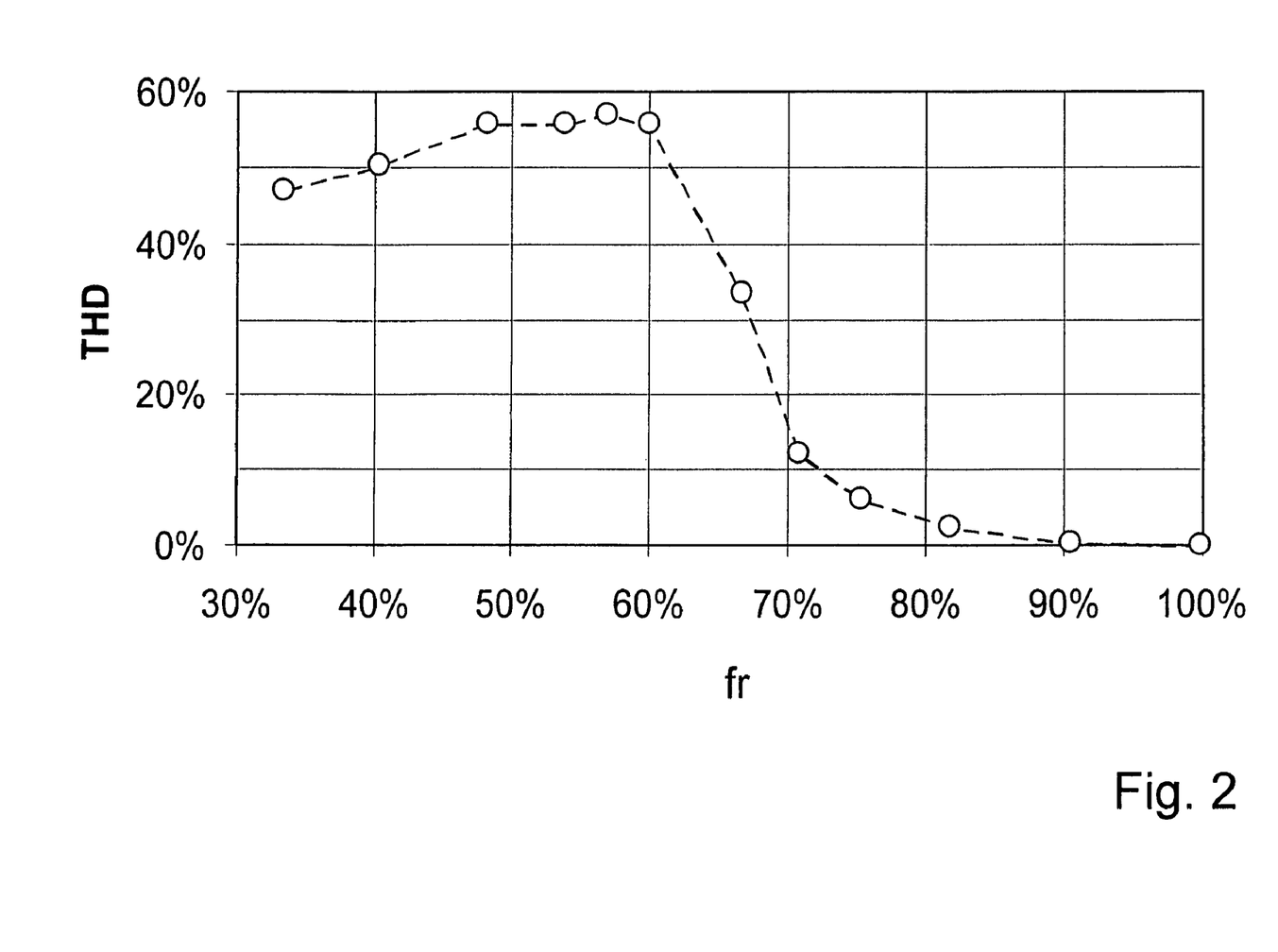
FIG. 2 shows a diagram illustrating the calculated total harmonic distortions as a function of the fraction of the common magnetic flux guided outside the ferromagnetic medium in a fault current limiter comparable to the one shown in FIG. 1b.

FIG. 2 illustrates the total harmonic distortion (THD) values of a primary current in a fault current limiter (comparable to the one shown in FIG. 1a, 1b) with different fractions fr of the common magnetic flux guided outside the magnetic medium in a high resistance state of the superconductor of the secondary coil. From the diagram it can be seen that in the example, the THD drops when the fraction fr of the magnetic flux guided outside the magnetic medium is about 65% or above. In the calculated and experimentally confirmed example, a sine wave voltage with $U_0$=5000V and a frequency of 50 Hz for the primary coil with N=40 windings, a length of 0.5 m, and a radius of 20 cm was chosen, further a series resistance of the primary coil corresponded to 0.2 Ohms, further a circular iron core made of Si doped transformer steel was employed. Eddy currents within the iron core were found as negligible ones in both regimes of normal operation and current conditioning modus.

Figure 3:
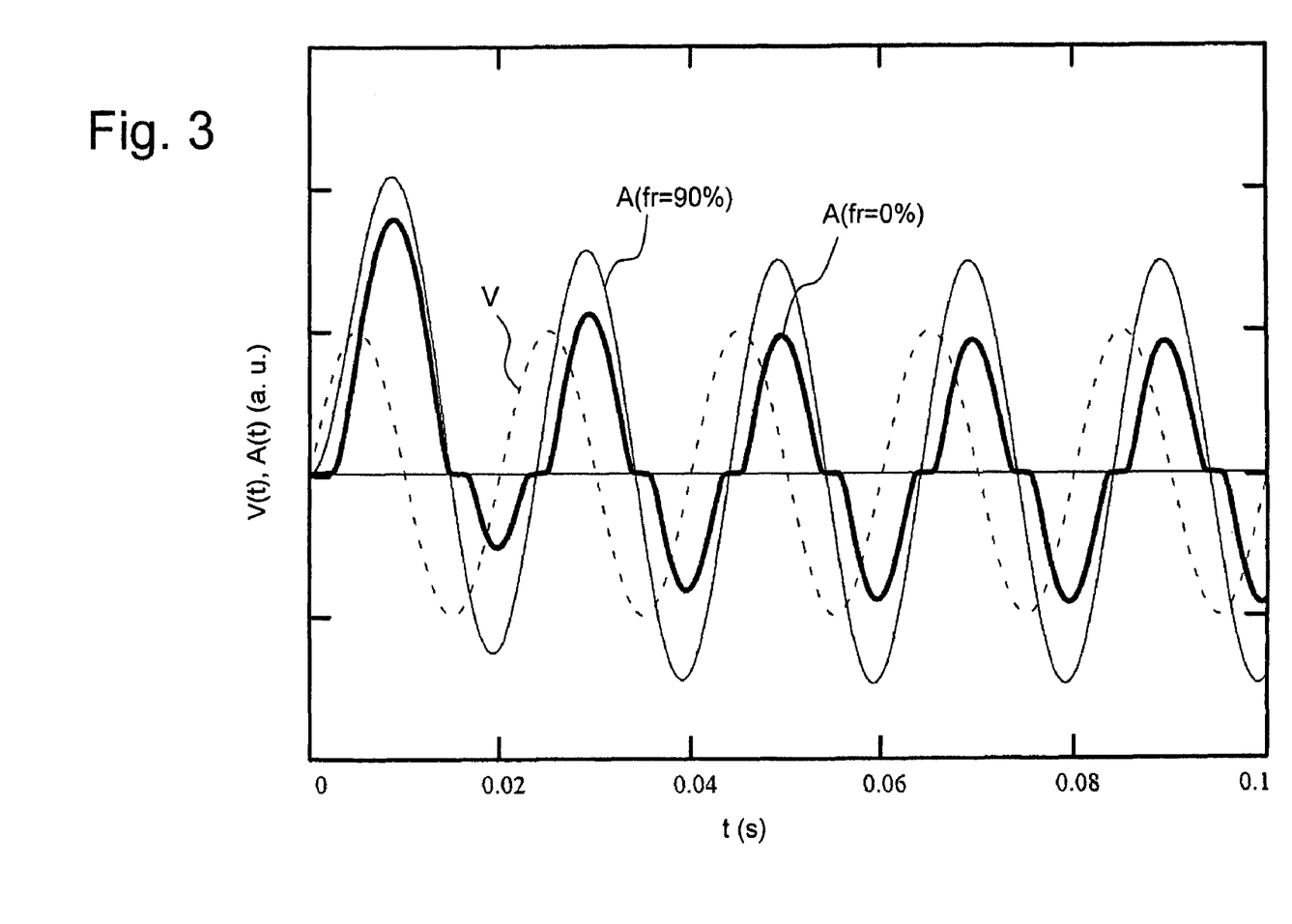
FIG. 3 shows a diagram illustrating the voltage and calculated current at the primary coil of a fault current limiter comparable to the one shown in FIG. 1b as a function of time, in the high resistance (quenched) state of the secondary coil, for different fractions of the common magnetic flux guided outside a ferromagnetic medium.

FIG. 3 illustrates the voltage V (which is of sine form, dashed line) at the primary coil, and the resulting primary current A in the primary coil as a function of time t, in the high resistance state of the secondary coil, for a fault current limiter comparable to the one shown in FIG. 1a, with a fraction fr of the common magnetic flux guided outside the magnetic medium of 0% (bold unbroken line) and 90% (thin unbroken line), both in arbitrary units (a.u.). The current A is in both cases phase shifted about $\frac{1}{4}^{th}$ of a repetition period as compared to the voltage V. The current for fr=0% exhibits a flat progression in the regions around the zero crossings, which is an indication for severe harmonic distortions. The current for fr=90% shows no flat progression at the zero crossings, but is over the full repetition period of sine type in a very good approximation, indicating that there are no significant harmonic distortions.

Figure 4A:
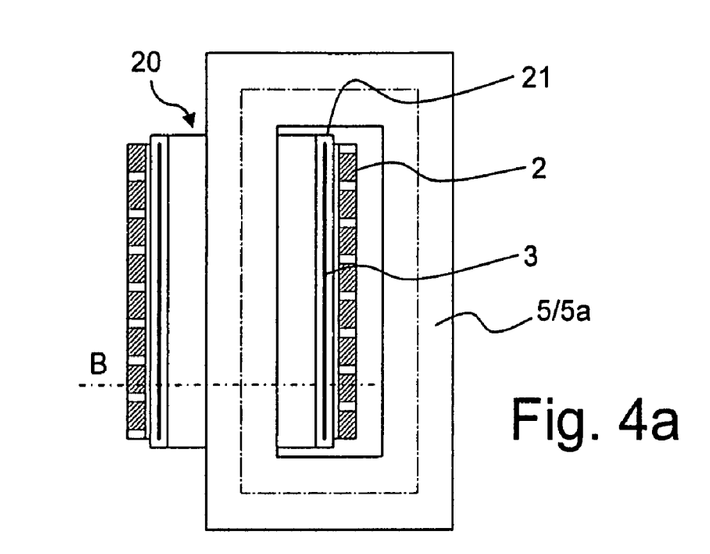
FIG. 4a, 4b show schematic cross-sections of another embodiment of an inventive fault current limiter, with a closed core.
Figure 4B:
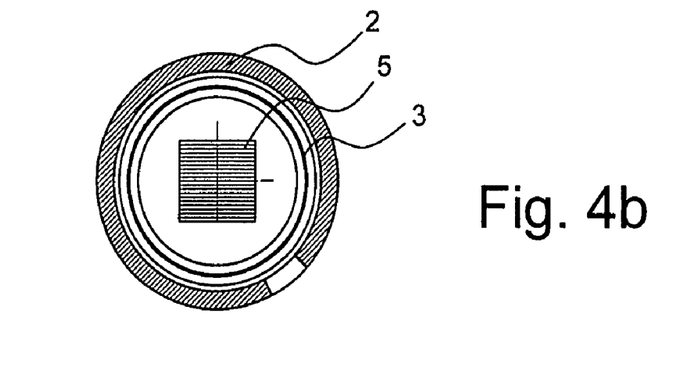

FIG. 4a illustrates in a vertical cross-section through an embodiment of an inventive fault current limiter 20, comprising a closed, ring-like core 5 of a ferromagnetic material 5a. The core 5 runs centrally through a primary coil 2 having eight windings, and a coaxially arranged secondary coil 3 of short-circuited, single turn type, wherein the latter is arranged in a vessel 21 filled with a cryogenic fluid. FIG. 4b shows a horizontal cross-section at line B through the fault current limiter of FIG. 4a. About 20% of the area of cross-section of the secondary coil 3 is taken by the core 5.

Figure 5A:
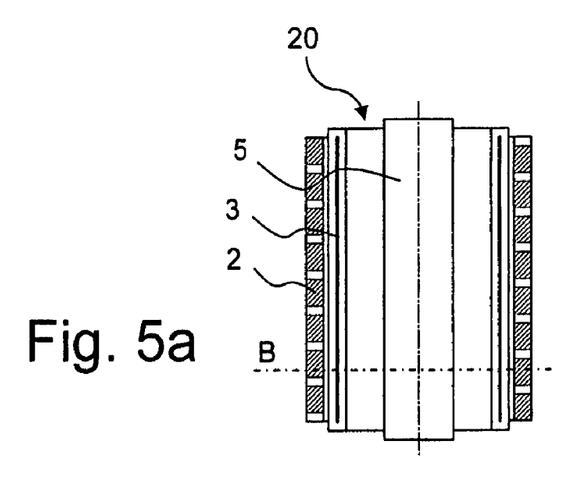
FIG. 5a, b show schematic cross-sections of another embodiment of an inventive fault current limiter, with an open core.
Figure 5B:
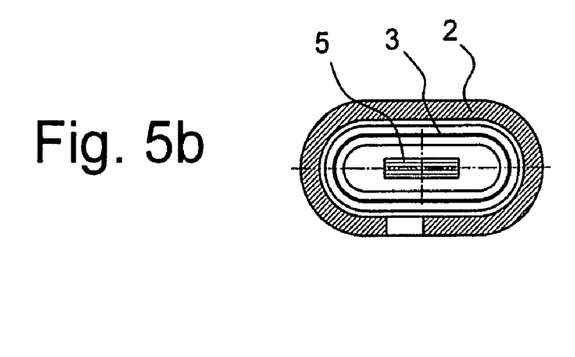

FIG. 5a illustrates in a vertical cross-section through an embodiment of an inventive fault current limiter 20 similar to the one shown in FIG. 4a, but with an open, pole-like core 5. Further, as can be seen in FIG. 5b showing a horizontal cross-section at line B of FIG. 5a, the fault current limiter is oblong in shape in the horizontal plane.

We claim:

1. A method for current conditioning, the method comprising the steps of:
   a) transporting a primary current through a primary coil;
   b) coupling a secondary coil to the primary coil via a common magnetic flux, the secondary coil comprising a superconductor capable of quenching, wherein the quenching causes a transition of the superconductor from a low resistance superconducting state to a high resistance quenched state;
   c) guiding, in the low resistance superconducting state of the secondary coil, a major fraction of the common magnetic flux of the primary coil and the secondary coil within a ferromagnetic medium; and
   d) switching, upon quenching, the common magnetic flux such that a major fraction of the common magnetic flux is guided outside the ferromagnetic medium in the high resistance quenched state of the superconductor.

2. The method of claim 1, wherein, in the low resistance state of the secondary coil, the ferromagnetic medium is not saturated and, in the high resistance state of the secondary coil, the ferromagnetic medium is saturated.

3. The method of claim 1, wherein a total common magnetic flux in the low resistance state of the secondary coil is smaller than a common magnetic flux guided outside the ferromagnetic medium in the high resistance state of the secondary coil.

4. The method of claim 1, wherein the primary current is an alternating current.

5. The method of claim 1, wherein the primary current is an alternating current superimposed with a direct current.

6. The method of claim 1, further comprising arranging a coolant within the primary coil and/or the secondary coil outside the ferromagnetic medium.

7. The method of claim 1, wherein, in the high resistance state of the secondary coil, a secondary current induced in the secondary coil has a modulus which is equal to or larger than $1/100$ of a modulus of the primary current multiplied by a number of windings of the primary coil.

8. The method of claim 1, wherein, in the high resistance state of the secondary coil, a secondary current induced in the secondary coil has a modulus which is equal to or larger than $1/50$ of a modulus of the primary current multiplied by a number of windings of the primary coil.

9. A fault current limiter comprising:
a primary coil;
a secondary coil having a superconductor capable of quenching; and
a core of a ferromagnetic medium, running through both said primary coil and said secondary coil, wherein said core, said primary coil and said secondary coil are disposed, structured and dimensioned to, upon quenching, switch a substantial fraction of a common magnetic flux of said primary coil and of said secondary coil from within said core to outside said core.

10. The fault current limiter of claim 9, wherein a major part of a cross-section of said primary coil and a major part of a cross-section of said secondary coil are not filled with said ferromagnetic medium.

11. The fault current limiter of claim 9, wherein said core is of a closed shape.

12. The fault current limiter of claim 9, wherein said core is of an open shape.

13. The fault current of claim 12, wherein said primary coil and said secondary coil are arranged coaxially.

14. The fault current limiter of claim 9, wherein said secondary coil is a single turn, short-circuited coil.

15. The fault current limiter of claim 14, wherein said single turn, short-circuited coil comprises a multitude of rings which are coupled to each other.

16. The fault current limiter of claim 9, wherein the fault current limiter further comprises a third coil for maintaining a screening eddy current.

17. The fault current limiter of claim 16, wherein said third coil is a normally conducting, single turn short-circuited coil.

18. The fault current limiter of claim 9, wherein said secondary coil comprises a high temperature superconductor.

19. The fault current limiter of claim 18, wherein said high temperature superconductor is of a coated conductor type.

20. Use of a fault current limiter in the method of claim 1.

* * * * *